United States Patent [19]

Mayeda et al.

[11] Patent Number: 4,585,073
[45] Date of Patent: Apr. 29, 1986

[54] ROTARY DISK TOOL ASSEMBLY AND IMPLEMENTS

[75] Inventors: Bruce H. Mayeda, Longmont; Robert R. Owen, Evergreen, both of Colo.

[73] Assignee: The Eversman Mfg. Company, Denver, Colo.

[21] Appl. No.: 643,879

[22] Filed: Aug. 24, 1984

[51] Int. Cl.[4] .................. A01B 21/06; A01B 23/00
[52] U.S. Cl. ............................... 172/158; 172/739; 172/774; 172/271; 172/522; 172/169
[58] Field of Search ............... 172/526, 522, 773, 774, 172/739, 574, 169, 49.5; 111/87; 171/95, 96; 56/255, 13.7, 13.9

[56] References Cited

U.S. PATENT DOCUMENTS

| | | | |
|---|---|---|---|
| 673,304 | 4/1901 | Tharp | 172/522 |
| 1,365,037 | 1/1921 | Johnson | 172/522 |
| 1,598,625 | 9/1926 | Todd | 172/522 |
| 2,018,575 | 10/1935 | Robinson | 171/30 |
| 2,187,833 | 1/1940 | Lock | 172/522 X |
| 2,546,260 | 3/1951 | Forney | 172/307 |
| 3,010,744 | 11/1961 | Hollis | 172/773 X |
| 3,129,773 | 4/1964 | Freeman | 172/522 |
| 3,830,047 | 8/1974 | Asumendi | 172/526 |
| 4,294,181 | 10/1981 | Smith | 172/522 |
| 4,506,610 | 3/1985 | Neal | 111/87 |

FOREIGN PATENT DOCUMENTS 224100 3/1958 Australia .......................... 172/522

Primary Examiner—Richard J. Johnson
Attorney, Agent, or Firm—Fields, Lewis, Pittenger & Rost

[57] ABSTRACT

An agricultural tool assembly (21) disclosed is usable on a variety of implements in place of shovels, blades, tines or sweeps and on novel cultivating or crop root undercutting implements and the like. Assembly (21) includes a rotary disk (23) mounted on a lower end of a rotary spindle (25). An offset mount for the spindle includes a shank (41) adapted to be received in the vertical slot of a clamp (22) and a sleeve (45) offset from the shank for rotatably supporting the spindle. The sleeve is connected to the shank, using a bifurcated portion comprised of spaced plates (47, 48) connected to the sleeve with a lower pivot member (52) and an upper fastener (58) extending through arcuate slots (61 and 62) in the spaced plates. The disk may be tilted at a selected angle or set horizontally and for some applications may be set to release in the event the blade strikes an obstruction. A cultivator implement has front and rear disk gangs (108, 109, 114, 115) and a rear centered tool assembly (21). An onion undercutting implement has a front tool bar (134) with front tool assemblies (121a, 121b and 121c) clamped thereto and a rear tool bar (135) with rear tool assemblies (122a, 122b and 122c) clamped thereto. A planter attachment has a support frame that disposes a tool assembly (21) ahead of the planter (230) to cut the old crop prior to have the planter deposit the seed.

14 Claims, 12 Drawing Figures

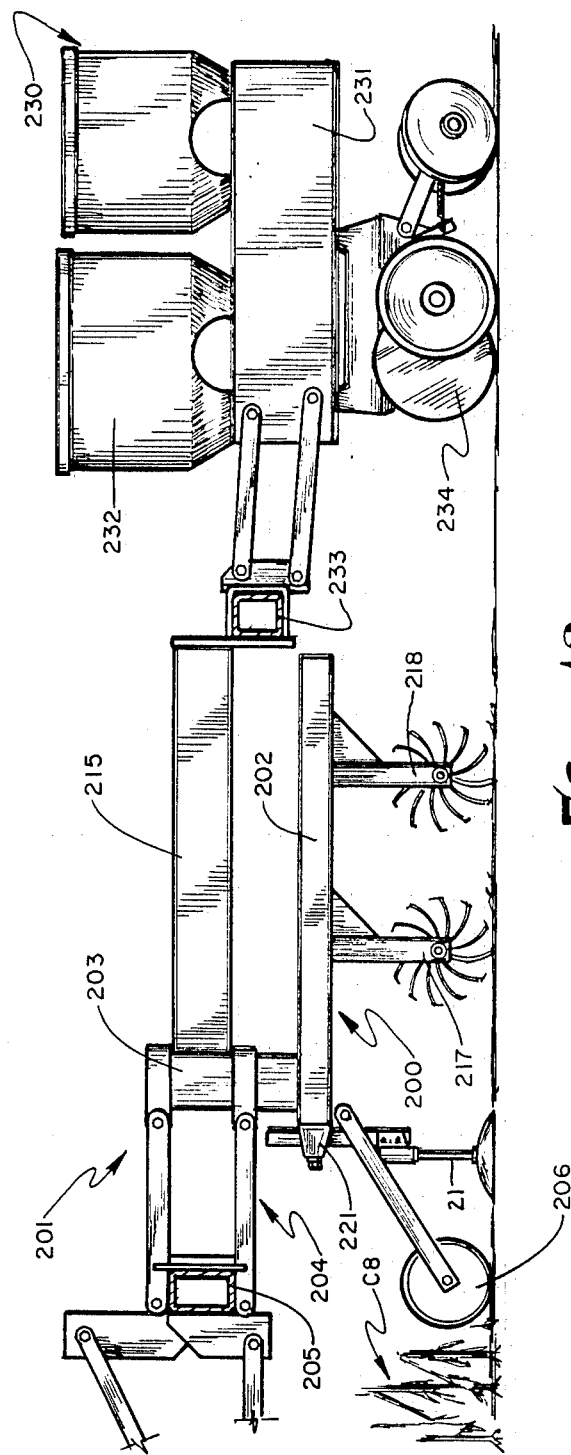

ROTARY DISK TOOL ASSEMBLY AND IMPLEMENTS

TECHNICAL FIELD

This invention relates to a novel and improved tool assembly and implements having a substantially horizontal rotary disk.

BACKGROUND ART

A variety of different types of agricultural tools referred to in the trade as shovels, blades, tines, and sweeps have heretofore been provided for performing agricultural operations which include crop cultivating, minimum tillage, crop cutting, and weed cutting.

A number of the present crop cultivators use a disk and knive, or a spring tine commonly called a "Danish Tooth," or a spider-like tool. These crop cultivators are frequently mounted on a shank in the slot of a tool bar clamp. Some attempts have been made to use horizontally disposed rotary disks for crop cultivating purposes. In general, those tools using a horizontally disposed rotary disk provided in the past have been an integral part of the implement or an integral part of a complete assembly and not an assembly that can be readily attached to an implement in place of other tools or used in combination with a conventional tool bar clamp or the like. In some instances the rotary disks heretofore provided have been power driven rather than freely rotatable.

The following are illustrative of the prior art patents using rotary disks:

Freeman U.S. Pat. No. 3,129,773 discloses a plurality of laterally spaced rotary disk blades mounted on a rigidly clamped axle of the vehicle in line with the axis of rotation of the disk blade.

Smith U.S. Pat. No. 4,294,181 discloses a rotary disk blade on the end of a vertical shaft that is made as an integral part of the implement frame.

Robinson U.S. Pat. No. 2,018,575 discloses the use of a rotary cutting disk mounted as an integral part of a frame for cutting the tops from onions.

DISCLOSURE OF INVENTION

A rotary disk tool assembly includes a disk secured to one end of a rotary spindle. The spindle is supported for free rotation in a sleeve that in turn is connected to an offset shank. The sleeve is pivotally connected to the lower end of a shank and fastened above the pivotal connection to dispose the disk horizontally or at a slight incline to the horizontal plane. The upper fastener is a shear pin or a solid bolt fastener disposed in slots in a bifurcated portion connected to the sleeve. The shank is movable in a slot of a tool bar clamp and clamped relative to a tool bar or like support on the implement to adjust the depth of the disk, and movement of the clamp laterally of the tool bar adjusts the lateral position of the disk relative to the crop row. The shank is readily removable from the clamp so that the assembly can be mounted to and dismounted from a variety of different types of presently available implements having a tool bar clamp or the like. A cultivator implement disclosed has upright front and rear disk gangs and a centrally disposed tool assembly. An onion cutting implement disclosed has a plurality of front and rear tool assemblies at laterally spaced intervals to undercut rows of onions and the like. An attachment for a planter disclosed mounts a tool assembly forwardly of the planter to cut old crops prior to having the planter deposit the seed.

BRIEF DESCRIPTION OF DRAWINGS

The details of this invention will be described in connection with the accompanying drawings, in which:

FIG. 12 is a side elevation view of a tool assembly on an attachment to a planter.

DETAILED DESCRIPTION

Figure 1:
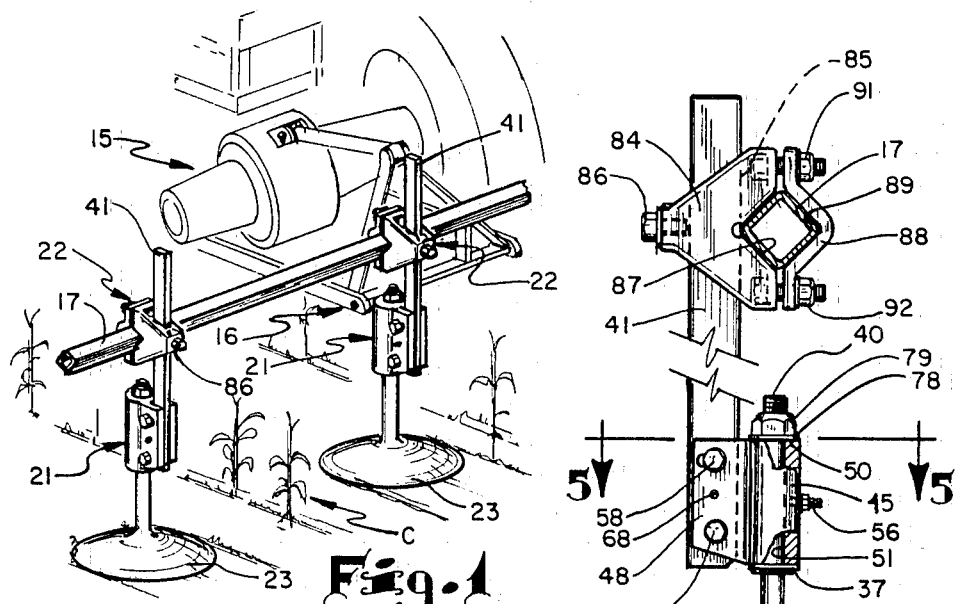
FIG. 1 is a rear perspective view showing rotary disk tool assemblies of the present invention on a solid bar support.
Figure 2:
FIG. 2 is a side elevation view of the tool assembly shown in FIG. 1 with portions broken away to show interior parts.
Figure 2:
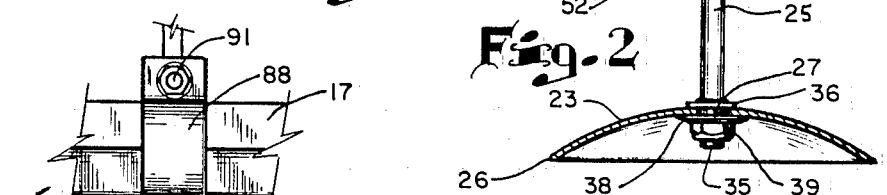
Figure 2:
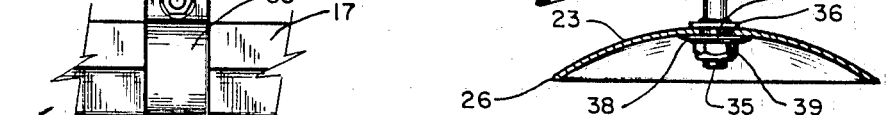
Figure 3:
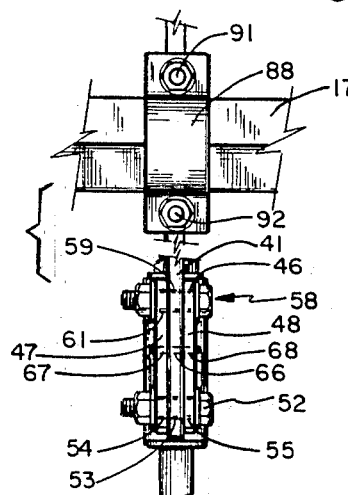
FIG. 3 is a rear elevation view of the tool assembly shown in FIG. 2 with portions shown in section.
Figure 4:
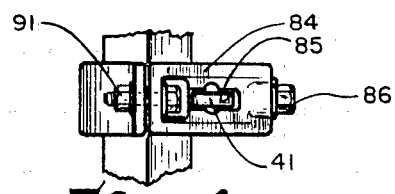
FIG. 4 is a top plan view of the assembly shown in FIG. 2.
Figure 5:
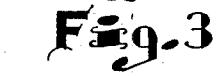
FIG. 5 is a sectional view taken along lines 5—5 of FIG. 2.
Figure 5:
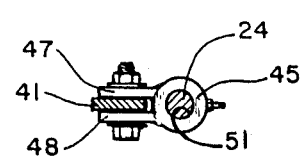
Figure 5:

Referring now to the drawings, there is shown a rear portion of a tractor 15 on which there is mounted a conventional three-point hitch 16 carrying a tool bar 17 to illustrate a solid bar mounting that is presently in use for carrying various types of cultivator tools such as shovels, blades, tines, sweeps and the like. Rotary disk tool assemblies 21 embodying features of the present invention are shown mounted at laterally spaced positions on a tool bar 17 using a tool bar clamp 22 for each assembly 21. As shown in FIG. 1, the assemblies 21 are disposed on opposite sides of a crop row C and have their disks 23 at least partially submerged in the soil for cultivating the soil on each side of the crop row C. Although only two assemblies 21 are shown on the tool bar in FIG. 1, it is understood that the bar can carry several to cultivate more than one crop row.

Each tool assembly 21 shown, generally stated, includes a rotary disk 23 mounted to an end of a rotary shaft or spindle 25. Each disk 23 is a circular inverted dish of concavo-convex shape with the concave surface facing down and has a sharp peripheral cutting edge 26 that is moved in proximity to or submerged in the soil in a substantially horizontal plane. The cutting edge 26 may be provided by making an outside bevel or an inside bevel on the periphery of the disk 23. The disk 23 shown is a segment of a sphere and it is understood that conical or flat (coulter) disks may also be used.

The disk 23 is made with a central opening 27 sized to slidably fit over the lower end portion of the spindle 25 to facilitate its ready removal from the spindle and its replacement on the spindle so that other sizes and shapes of disks may be used on the same spindle. The lower end portion 35 of the spindle 25 is of reduced diameter and is provided with external threads. Threaded lower end portion 35 extends through the central aperture 27 in the disk.

A lower washer 36 is affixed to the spindle as by welding above the lower threads to provide a lower stop for the disk. An upper washer 37 is affixed to the spindle above and in spaced relation to lower washer 36 to provide an upper stop to limit its extent of movement upwardly into the support sleeve 45 and close the lower end of the sleeve 45. A Belleville washer 38 having its concave surface facing up fits over the threaded lower end portion 35 and a nut 39 threads on the lower end portion 35 to allow the disk blade 23 to be assembled on the spindle 25 and rigidly affix the disk to the spindle, as well as to allow the disk to be removed and replaced as required. The spindle further has an externally threaded upper end portion 40 extending above the top of sleeve 45.

An offset mount for the spindle 25 includes an elongated shank 41 and a tubular housing or sleeve 45 that is offset from and adjustably connected to the shank 41. The sleeve 45 has a top surface 50 and an interior circular surface 51 complementary in shape to the exterior circular shape of the spindle. There is a close tolerance between the two concentric surfaces, yet the spindle and disk rotate freely relative to the sleeve. A grease fitting 56 is shown in the sleeve 45 to allow lubrication of the spindle 25. The spindle preferably is chrome-plated.

The connection between the sleeve and shank shown includes a bifurcated portion formed by spaced left and right side plates 47 and 48 connected along one edge to the sleeve 45 to form an open slot sized to slidably receive and embrace the shank so that the shank 41 is slidable up and down in the spaced plates. A pivot member 52 in the form of a bolt, nut, and washers has the bolt extending through an upper aperture 53 in the lower end portion of the shank and alined lower apertures 54 and 55 in the bifurcated portion to pivotally mount the lower end portion of the shank to the spaced plates.

An upper fastener 58 in the form of a bolt, nut, and washers has the bolt extending through an upper aperture 59 in the shank and through arcuate slots 61 and 62 in plates 47 and 48 to provide an angular movement of the axis of the shank.

The shank 41 further has an aperture 66 between the pivot member 52 and the upper fastener 58. The spaced plates 47 and 48 have apertures 67 and 68, in alinement therewith when the spindle is vertical, adapted to receive a shear bolt for some applications, as is described hereinafter.

In the assembly of the spindle to the sleeve, the upper end portion of the spindle is inserted into the bottom of the sleeve, a top washer 78 is placed on the spindle, and a top nut 79 is threaded on upper threads 40 to hold the spindle for free rotation in the sleeve portion. The sleeve precedes the shank in the mounting shown in FIG. 1, leaving the slot formed by the spaced plates facing toward the rear.

The tool bar clamp 22 shown has a main body 84 with a vertical slot 85 of rectangular shape sized to slidably receive the shank of the tool assembly. This vertical slot provides interior guide surfaces for the shank 41 as it is moved up and down therein. A locking bolt 86 extends into the slot to bear against the shank and lock it at a selected elevation relative to the clamp.

The main body has a V-shaped recess 87 opposite the locking bolt shaped to accommodate one half of the tool bar 17 and a clamping bracket 88 having a V-shaped recess 89 shaped to receive the other half of the tool bar. The clamping bracket 88 is fastened to the main body by means of upper and lower bolt assemblies 91 and 92 which extend through respective apertures in the main body of the clamp.

This arrangement allows the clamp to be slid along the tool bar 17 and clamped in any position in relation to the crop row and, further, allows the shank 41 to be moved up and down relative to the tool bar to adjust the disk to a selected depth relative to the soil surface. Further the shank is readily demountable from the clamp so that the tool assemblies 21 may be readily removed from the tool bar and replaced as required.

By way of illustration but not limitation, the shanks may have dimensions of $\frac{5}{8}''\times 2''$; $\frac{3}{4}''\times 2\frac{1}{2}''$ or $1''\times 3''$. The $\frac{5}{8}''$ and $\frac{3}{4}''$ shanks are heat-treated. The disks are 10", 12", 14", 16", 20" or 22" in diameter.

There are a variety of tool bar sizes and cross-sectional shapes presently in use on agricultural implements. These tool bar clamps will accommodate shanks of different sizes and cross-sectional shapes. A number of these presently available tool bar clamps allow adjustment of a shank up and down and laterally of the tool bar so as to allow for both lateral and vertical adjustment of the tool assembly.

In addition to the solid bar type mounting shown in FIG. 1, another example that is commonly in use is the parallel link such as the Yetter Row Crop Cultivator that has front and rear S-tines and a centered rear S-tine. The tool assembly of the present invention can be readily mounted in a clamp at the rear of the frame in place of the rear S-tine.

From the foregoing it is apparent that a desired number of the tool assemblies 21 may be mounted on the tool bar of a farm tractor having vertically slotted tool bar clamps or on the tool bar clamp on the frame of an agricultural implement as replacements for one or more conventional cultivating tools.

Figure 7:
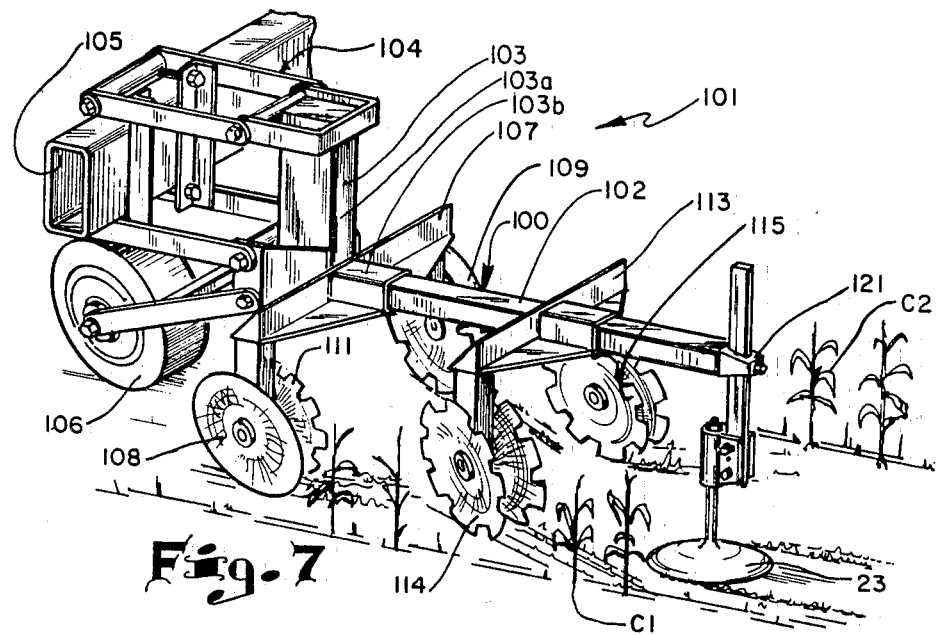
FIG. 7 is a rear perspective view of a cultivator implement.
Figure 8:
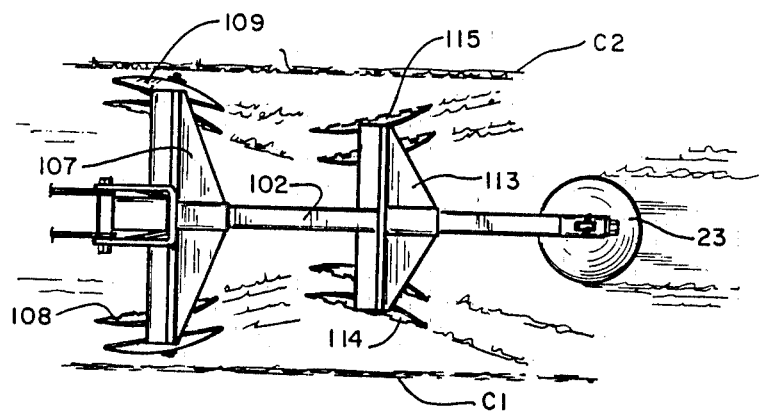
FIG. 8 is a top plan view of the cultivator implement shown in FIG. 7.

Referring now to FIGS. 7 and 8, a row crop cultivator implement 101 is shown in position for cultivating between two crop rows C1 and C2. Implement 101 comprises a supporting frame 100 including a longitudinally extending horizontal center frame member 102 and a front upright frame member 103 in the form of an elbow having an upright post 103a and a lower leg 103b telescoped over the front end of the longitudinal frame member 102. The means to secure the supporting frame to a power unit shown is a conventional four-bar linkage 104 which is pivotally connected to the front upright post 103a and is constructed and arranged in a conventional manner to secure the supporting frame to a tool bar 105 carried by a tractor or the like, so that the supporting frame can be moved along the soil over a crop row. A depth gauge wheel 106 is mounted at the front end of the frame.

The supporting frame 100 has a front transverse member 107 that supports a left front disk gang 108 and a right front disk gang 109. There are two disks in each gang. Each inside of each pair of disks has a series of equally spaced peripheral notches 111. These front disk gangs are arranged on opposite sides of the frame with the concave surfaces facing in and each gang is turned out at a selected gang angle from a straight-ahead position.

A rear transverse member 113 supports a left rear disk gang 114 and a right rear disk gang 115 arranged on opposite sides of the center frame with the concave surfaces facing out and each gang is turned in at a selected gang angle. Each of the rear disks has equally spaced peripheral notches. The left front side disk gang is in tandem with the left rear side disk gang. The right front side disk gang is in tandem with the right rear side disk gang. The front gangs move the soil toward the center frame and the rear gangs move the soil away from the center frame.

A rear clamp 121 is made integral with the rear end of the supporting frame 100 to support the shank of a disk tool assembly such that the disk is moved through the soil to cultivate the central portion of the ground between the rows.

An alternative arrangement is to provide a front clamp integral with the front of the center frame that would till or cultivate the soil prior to its being cut by the front and rear gangs of disks.

Figure 9:
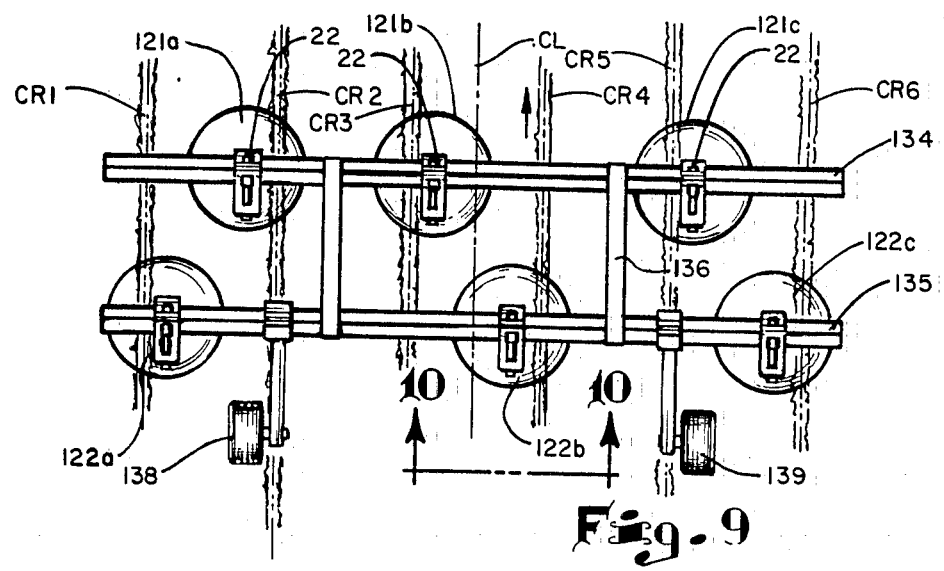
FIG. 9 is a top plan view of an implement for onion undercutting.
Figure 10:
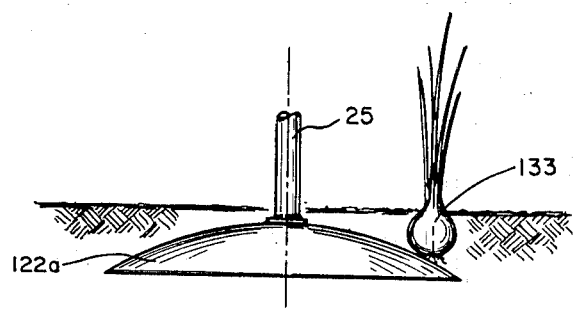
FIG. 10 is a sectional view taken along lines 10—10 of FIG. 9 showing the undercutting operation.
Figure 11:
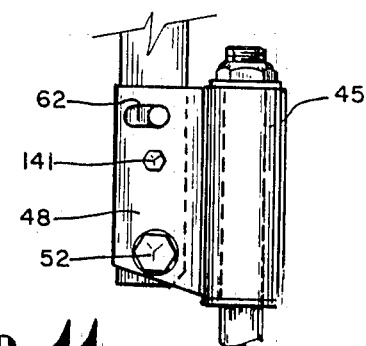
FIG. 11 is a side elevation view showing a portion of the tool assembly of the implement of FIG. 9 using a shear pin.

The implement shown in FIGS. 9-11 is particularly suited for undercutting the roots of onions, garlic, etc., 133, as shown in FIG. 10. The implement shown has a supporting structure which includes a front tool bar 134 and a rear tool bar 135 that are connected together by a plurality of suitable laterally spaced longitudinal connecting members 136 on each side of the machine center line CL. A conventional hitch (not shown) is connected to the front tool bar. The direction of movement for the implement is shown by an arrow.

On the front tool bar 134 there is mounted, proceeding from left to right, a plurality of front tool assemblies 121a, 121b and 121c, each by means of a clamp 22, and the rear tool bar has a plurality of rear tool assemblies 122a, 122b and 122c mounted by means of clamps 22 to the rear tool bar.

The left rear tool assembly 122a undercuts the first crop row CR1, the left front tool assembly 121a undercuts the second crop row CR2, and the intermediate front tool assembly 121b undercuts the third crop row CR3, all to the left of the center line designated CL of the machine. To the regret of this machine center line, the intermediate rear tool assembly 122b undercuts the fourth crop row CR4, the right front tool assembly 121c undercuts the fifth crop row CR5, and the right rear tool assembly undercuts the sixth crop row CR6. The crop rows are equally spaced as, for example, 22 inches between rows. A pair of depth wheels 138 and 139 are mounted on the rear tool bar inside assemblies 122a and 122c, respectively, as shown.

In operation, as the implement moves along the line the disks extend to a preselected depth below the ground surface and cut the roots of the crop, such as the onions indicated. For this operation the disk is held in a horizontal plane and the assembly is fastened by means of a shear bolt 141 which extends through apertures 66, 67 and 68 above described. In the event the disk hits an obstruction, the shear bolt 141 will break and the spindle can pivot about pivot member 52 relative to the shank.

Figure 6:
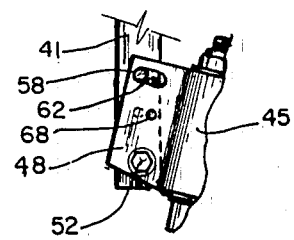
FIG. 6 is a fragmentary side elevation view showing the adjustable tilt mount for the spindle with the head of the upper fastener removed.
Figure 6:
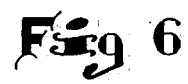

Referring now to FIG. 12, another implement for carrying the tool assembly 21 is illustrated as an attachment 201 to the planter 230. The planter attachment 201 shown has support structure similar to the cultivator implement 101 of FIGS. 6 and 8, including a supporting frame 200 with a longitudinally extending horizontal center frame member 202 with a front upright frame member 203 and a four-bar linkage 204 pivotally connecting the frame to a transverse tool bar 205. A depth gauge wheel 206 is pivotally connected to and projects forwardly of the front end of the supporting frame 200.

A clamp 221 is mounted to and made an integral part of the forward end of the frame member 202. A tool assembly 21 is carried in the clamp 221 rearwardly of the gauge wheel 206. The tool assembly 21 is mounted with the disk blade in the horizontal position. A pair of spiders 217 and 218 are shown depending from the frame rearwardly of the tool assembly to work the soil, but this is optional.

The planter 230 shown may take various forms but the form illustrated has a frame 231, a hopper 232 containing the seed, a fastening arrangement 233 to connect the planter to the tool bar, and a disk opener 234 to deposit the seed into the soil.

To the support structure for the tool assembly is added a connecting member 215 in the form of a length of metal tubing of square cross section that connects between the front end to the tool bar 205 and the rear end to the tool bar attachment 233 of the planter.

This arrangement locates the tool assembly 21 ahead of the planter so that it will cut the old crop C8 prior to deposit of seed by the planter.

Although the present invention has been described with a certain degree of particularity, it is understood that the present disclosure has been made by way of example and that changes in details of structure may be made without departing from the spirit thereof.

What is claimed is:

1. A tool assembly for agricultural purposes comprising:
   a rotary disk having a peripheral cutting edge mounting to an end of a substantially vertical rotary spindle; and
   mounting means for said spindle including an elongated shank and a sleeve connected to and offset from said shank, said shank having a length of substantially uniform cross section so as to be capable of being slidably received in an upright slot of a clamp on a support movable along the ground, set at a selected elevation by a locking means, and readily removed from and replaced on the clamp, said sleeve rotatably supporting said spindle, said connection between said shank and sleeve including pivot means at a lower end portion of said shank, an offset portion between said shank and sleeve with said pivot means pivotally connecting said offset portion to said shank at a first connection to offset the axis of said spindle from the axis of said shank to enable said sleeve to pivot about said pivot means in relation to aid shank about a substantially horizontal axis and sleeve locking means connecting said offset portion and said shank at a second connection displaced from said pivot means, said sleeve locking means being releasable to enable said offset portion and sleeve to be pivoted about said pivot means whereby to set said sleeve at a fixed position relative to said shank and to selectively position said spindle upright and said cutting edge in a horizontal plane or at an angle to a horizontal plane as they are moved along the ground.

2. A tool assembly as defined in claim 1 wherein said disk is in the form of a circular, inverted dish of a concavo-convex shape with a concave surface facing down, said disk being made of a high carbon steel.

3. A tool assembly as set forth in claim 2 wherein said disk is a segment of a sphere.

4. A tool assembly as set forth in claim 1 wherein said spindle has an externally threaded lower end portion and a lower stop above said threaded lower end portion, said disk being held against said lower stop by a Belleville washer fitted over said lower threaded portion with a concave surface facing up and a bottom nut threaded on said lower threaded portion and urging said Belleville washer against said disk.

5. A tool assembly as set forth in claim 1 wherein said shank has a generally rectangular cross section and is made of a heat-treated metal.

6. A tool assembly as set forth in claim 1 wherein said spindle is chrome-plated and has an externally threaded upper end portion and a top nut threaded on said threaded upper end portion with a top washer under said nut.

7. A tool assembly as set forth in claim 6 wherein said sleeve has a top surface and an interior surface complementary in shape to the exterior shape of said spindle, said top nut and top washer being greater in diameter than said interior surface to provide a lateral flange surface to support said spindle for free rotation relative to said sleeve.

8. A tool assembly for agricultural purposes comprising:
a rotary disk having a peripheral cutting edge mounted to an end of a rotary spindle; and
mounting means for said spindle including an elongated shank and a sleeve connected to and offset from said shank, said shank being adapted to be slidably received in an upright slot of a clamp on a support movable along the ground, set at a selected elevation by a locking means, and readily removed from and replaced on the clamp, said sleeve rotatably supporting said spindle, said connection between said shank and sleeve including pivot means for connecting said sleeve to a lower end portion of said shank to enable said sleeve to pivot in relation to said shank about a substantially horizontal axis, said connection between said shank and said sleeve including a bifurcated portion having spaced plates connected along side edges to said sleeve and slidably receiving said shank, and sleeve locking means to set said sleeve at a fixed position relative to said shank whereby to position said spindle upright and said cutting edge in a substantially horizontal plane as they are moved along the ground, said sleeve locking means including an upper fastener extending through said bifurcated portion and shank, said pivot means including a pivot member below said upper fastener extending through said bifurcated portion and said shank.

9. A tool assembly as set forth in claim 8 wherein said upper fastener is slidable in alined arcuate slots in said spaced plates to enable said sleeve to pivot relative to said shank and has means to lock said bifurcated portion to said shank at a selected setting to enable said spindle to be disposed perpendicular to a horizontal plane or turned to a selected tilt angle.

10. A tool assembly as set forth in claim 8 wherein said upper fastener is a shear bolt extending through said shank and said bifurcated portion that will break to enable said sleeve, spindle and disk to pivot about said pivot means when said disk strikes an obstruction or the like.

11. A rotary disk tool assembly for soil tilling, cultivating, plant cutting, and the like comprising:
a rotary disk mounted to an end of a chrome-plated spindle,
said disk being in the form of a circular, inverted dish of a concavo-convex shape with a concave surface facing down and having a peripheral cutting edge, said disk having a central opening and being made of a high carbon steel,
said spindle having an externally threaded lower end portion extending through the central opening of said disk, a lower stop above said threaded lower end portion, and an upper stop above and in spaced relation to the lower stop, said disk being held against said lower stop by a Belleville washer fitted over said lower threaded portion with a concave surface facing up and a bottom nut threaded on said lower threaded portion and urging said Belleville washer against said disk, said spindle having an externally threaded upper end portion, a top nut threaded on said threaded upper end portion and a top washer under said nut; and
an elongated shank having a generally rectangular cross section and being made of heat-treated steel, said shank being adapted to be slidably received in an upright slot of a clamp on a support movable along the ground and set at a selected elevation by a shank locking means;
a sleeve connected to and offset from said shank, said sleeve having a top surface and an interior surface complementary in shape to the exterior shape of said spindle, said top washer and top nut being greater in diameter than said interior surface to support said spindle for free rotation relative to said sleeve,
said connection between said shank and said sleeve including a bifurcated portion having spaced plates connected to said sleeve and slidably receiving said shank, pivot means extending through said bifurcated portion and shank connecting said sleeve to a lower end portion of said shank to enable said sleeve to pivot in relation to said shank about a substantially horizontal axis, and sleeve locking means including an upper fastener extending through said bifurcated portion and shank to set said sleeve at a fixed position relative to said shank whereby to position said cutting edge in a substantially horizontal plane as it is moved along the ground, said pivot means including a pivot member below said upper fastener extending through said bifurcated portion and said shank.

12. In combination with an agricultural implement having support means adapted to be moved over the soil,
at least one clamp carried on said support means having a vertical slot, shank locking means extending into said slot, and
a rotary disk tool assembly adjustably and removably carried by said clamp, said tool assembly including:
a circular disk having a peripheral cutting edge mounted to an end of a rotary spindle; and
an offset mounting means for said spindle including an elongated shank slidable in said upright slot and set at a selected elevation in relation to the surface of the ground by said locking means, and a sleeve offset from and adjustably connected to said shank for supporting said spindle for rotation, said sleeve being adjustably movable through an arc relative to said shank to enable said spindle to be disposed perpendicular to a horizontal plane or tilted at a selected angle relative to the longitudinal axis of said shank and having means to lock said disk substantially in a horizontal plane or at a selected angle relative to a horizontal plane as it is moved along the ground.

13. In agricultural apparatus suitable for use as a row crop cultivator, the combination comprising:

support means adapted to extend between two rows of crops and adapted to fasten to a tool bar or the like for movement along the ground;

two gangs of upright front disks on opposite sides of said support means, said front disks having concave surfaces facing said frame means and outturned from a straight-ahead position at a selected gang angle;

two gangs of rear disks on opposite sides of said support means, said rear disks having concave surfaces facing away from the frame means and inturned from a straight-ahead position at a selected gang angle;

a clamp at one end of said support means having a vertical slot and shank locking means extending into said slot;

a disk tool assembly adjustably and removably carried by said clamp, said assembly including a disk having a peripheral cutting edge mounted to an end of a rotary spindle; and offset mounting means for said spindle including an elongated shank and a sleeve connected to and offset from said shank, said shank being adapted to be slidably received in an upright slot of a clamp on a support movable along the ground and set at a selected elevation by a locking means, said sleeve rotatably supporting said spindle, said connection between said shank and sleeve including pivot means for connecting said sleeve to a lower end portion of said shank to enable said sleeve to pivot in relation to said shank about a substantially horizontal axis and sleeve locking means to set said sleeve at a fixed position relative to said shank whereby to position said cutting edge in a substantially horizontal plane as it is moved along the ground.

14. In agricultural apparatus suitable for use as a plant cutter, the combination comprising:

support means including a front tool bar and a rear tool bar joined in a longitudinally spaced relationship by longitudinal connecting members;

a plurality of laterally spaced front tool assemblies clamped to said front tool bar;

a plurality of laterally spaced rear tool bar assemblies clamped to said rear tool bar, each said tool bar assembly having:

a disk having a peripheral cutting edge mounted to an end of a rotary spindle; and mounting means for said spindle including an elongated shank and a sleeve connected to and offset from said shank, said shank being adapted to be slidably received in an upright slot of a clamp on a support movable along the ground, set at a selected elevation by a locking means, and readily removed from and replaced on the clamp, said sleeve rotatably supporting said spindle, said connection between said shank and sleeve including pivot means for connecting said sleeve to a lower end portion of said shank to enable said sleeve to pivot in relation to said shank about a substantially horizontal axis and sleeve locking means to set said sleeve at a fixed position relative to said shank whereby to position said spindle upright and said cutting edge in a substantially horizontal plane, said tool assemblies being disposed at substantially equal laterally spaced intervals and at a selected depth in the soil to undercut the roots of a plurality of rows of crops as they are moved through the soil.

* * * * *